United States Patent Office 3,839,343
Patented Oct. 1, 1974

---

3,839,343
SYMMETRICAL POLYFLUOROISOALKOXYALKYL QUATERNARY AMMONIUM SULFATES
Louis G. Anello, Orchard Park, and Richard F. Sweeney, Elma, N.Y., assignors to Allied Chemical Corporation, New York, N.Y.
No Drawing. Filed Nov. 10, 1969, Ser. No. 875,547
Int. Cl. C07d 31/48
U.S. Cl. 260—294.8 R 6 Claims

ABSTRACT OF THE DISCLOSURE

Symmetrical quaternary ammonium sulfates having the formula $$(R_fQ)^+O\bar{S}O_2OR_f$$

wherein Q is a quaternary ammonium radical and $R_f$ has the formula

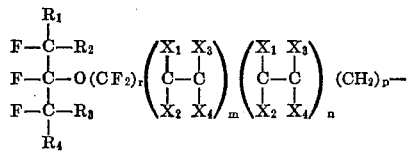

wherein $R_1-R_4$ are fluorine, chlorine or perhaloalkyl; $X_1-X_4$ are hydrogen, fluorine, chlorine or bromine; $r$ is an integer from 1-2, $m$ and $n$ are integers from 0-20, and $p$ is an integer from 0-1. These compounds are surface active agents and can be used to form oil repellent coatings on textiles.

SUMMARY OF THE INVENTION

The compounds of this invention are symmetrical quaternary ammonium sulfates of the formula $$(R_fQ)^+O\bar{S}O_2OR_f$$

wherein Q is a quaternary ammonium radical and $R_f$ is a polyfluoroisoalkoxyalkyl radical of the formula

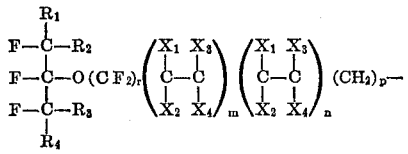

wherein
(a) $R_1$, $R_2$, $R_3$ and $R_4$ can be independently selected from the group consisting of fluorine, chlorine and perhaloalkyl groups of 1 to 10 carbon atoms, or when taken together $R_1-R_4$ may form a perhalocycloalkyl structure, the halo portions of $R_1-R_4$ being fluorine or chlorine, with the provisos that each carbon atom of $R_1-R_4$ contain at least one fluorine atom, $R_1$ and $R_2$ cannot both be chlorine and $R_3$ and $R_4$ cannot both be chlorine; preferably $R_1-R_4$ are fluorine or perfluoroalkyl groups of 1 to 3 carbon atoms, most preferably $R_1-R_4$ are fluorine.

(b) $X_1$, $X_2$, $X_3$ and $X_4$ independently can be hydrogen, fluorine, chlorine or bromine, provided that each $X_1-X_4$ group do not include more than two chlorine atoms or one bromine atom, and when $X_1$ and $X_3$ independently are each hydrogen or fluorine, each of $X_2$ and $X_4$ independently may be $CF_2R_5$ wherein $R_5$ is a halogen, alkyl or haloalkyl radical of 1 to 8 carbon atoms in which the halogen atoms are fluorine, chlorine or bromine, the $(X_1X_2C-CX_3X_4)_m$ and $(X_1X_2C-CX_3X_4)_n$ moieties may be the same or different; preferably $X_1-X_4$ independently can be hydrogen, fluorine or chlorine.

(c) $r$ is an integer from 1-2, $m$ and $n$ are integers from 0-20, the sum of $m$ and $n$ is 0-20, preferably $m$ and $n$ are 0-10, $p$ is an integer from 0-1, with the proviso that when $p$ is 0, $n$ must be at least one and $X_3$ and $X_4$ in the $(X_1X_2C-CX_3X_4)_n$ moiety must be hydrogen.

The criticality in the structure of the above described compounds is in the polyfluoroisoalkoxyalkyl tail portion of the molecule wherein an ether oxygen atom links a fluorinated carbon atom attached to two fluoroalkyl groups and at least one —$CF_2$— group.

The novel compounds of this invention are surface active agents. They show good detergency, wetting properties, foaming capability, and foam stability at low concentrations. In addition they are useful as surface tension depressants for aqueous solutions and organic solvents, leveling agents in wax formulations, fire extinguishing agents for hydrocarbon-type fires, and oil repellent coatings for textiles.

DETAILED DESCRIPTION OF THE INVENTION

The compounds of this invention can be prepared by reacting a fluorinated dialkyl sulfate of the formula $(R_fO)_2SO_2$, wherein $R_f$ is as defined above, with a tertiary amine. Preferably the dialkyl sulfate is added to the amine. Generally the mole ratio of tertiary amine to dialkyl sulfate varies from about 1:1 to about 10:1.

The reaction preferably is carried out at about atmospheric pressure, although higher pressures can also be used. The reaction temperature can range from about 25° C. to about 200° C., preferably from about 50° C. to about 100° C. Reaction time will vary depending on the particular starting materials and on the temperature and pressure. Generally reaction time is from about 0.5 hours to about 5 hours.

Preferably Q is a quaternary ammonium radical of the formula

wherein $w$ is an integer from 0–1; when $w$ is one $R_6$, $R_7$ and $R_8$ independently can be alkyl (straight chain or branched) of 1 to 12 carbon atoms, preferably of 1 to 6 carbon atoms; hydroxyalkyl of 1 to 12 carbon atoms, preferably of 1 to 6 carbon atoms, cycloalkyl of up to 6 carbon atoms, aryl of up to 9 carbon atoms, or $R_6$ and $R_7$ can be joined to form a saturated heterocyclic structure of up to 6 carbon atoms; and when $w$ is 0, $R_6$ and $R_7$ can be joined to form an aromatic heterocyclic structure of up to 9 carbon atoms. Preferably not more than one of $R_6$, $R_7$ and $R_8$ is cycloalkyl or aryl. Most preferably Q is pyridine or a trialkyl amine of up to 12 carbon atoms in which each alkyl group independently contains from 1 to 6 carbon atoms.

Suitable tertiary amines are well known and include, for example, trialkyl amines such as trimethylamine, triethylamine, tributyl amine, tridodecylamine, methyldiethylamine dimethylhexylamine and the like; hydroxyalkyl amines such as hydroxyethyldimethylamine, trihydroxyethylamine, and the like; cycloalkyl amines such as dimethylcyclohexylamine, ethyldicyclohexylamine, tricyclohexylamine and the like; aromatic amines such as benzyldimethylamine, dimethylaniline, di - n - propylaniline triphenylamine and the like; heterocyclic amines, such as pyridine, 4-hydroxyethylpyridine, quinoline, picoline, lutidine, N-methylmorpholine, N-methylpiperidine and the like.

The fluorinated dialkyl sulfates and their method of preparation are described in copending U.S. application Ser. No. 659,867, filed Aug. 11, 1967, now U.S. Pat. No. 3,562,310, the pertinent subject matter of which is hereby incorporated by reference.

Essentially the fluorinated dialkyl sulfates are prepared by reacting the corresponding fluorinated iodides with oleum or with sulfur trioxide in about a 1:1 mole ratio. Temperatures ranging from about 0° C. to about 200° C. and pressures from about 1 to 300 atmospheres can be employed. It is preferred to operate at such temperature and pressure that at least a portion of the iodide reactant is maintained in the liquid phase.

The fluorinated iodides may be prepared by reacting an appropriate ketone with an ionizable fluorine salt, e.g. CsF or KF, to form a fluorinated organic salt which is then reacted with a halogen other than fluorine (e.g., iodine, bromine) and an appropriate olefin to form telogen iodides, as illustrated below.

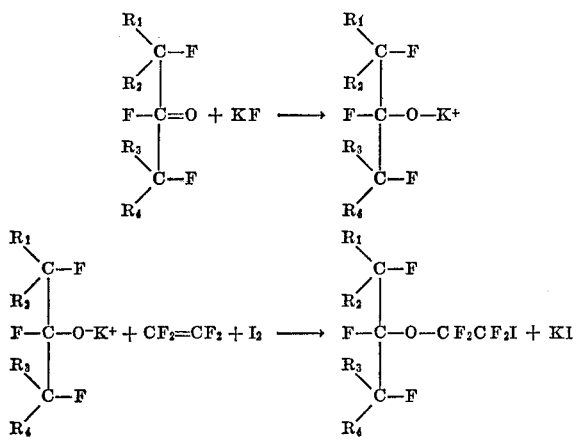

The telogen iodides can then be reacted with additional appropriate olefins. These reactions can be initiated by heat, e.g., temperatures from about 100° C. to 350° C., or by a free radical initiator such as azobisisobutyronitrile, benzoyl peroxide and the like. These reactions are described in greater detail in copending U.S. application of Anello et al., Ser. No. 633,359, filed Apr. 25, 1967, the pertinent subject matter of which is hereby incorporated by reference.

The telogen iodides having only one —$CF_2$— group linking the oxygen and iodine atoms can be prepared by reacting a telogen iodide having two —$CF_2$— groups with sulfur trioxide to form an acid halide. This reaction is carried out at temperatures between about 50–175° C. Preferably, an excess of $SO_3$ is used and sufficient pressure is employed to maintain the reactants in the liquid phase. The acid halide is hydrolyzed to the acid by refluxing in water. The resulting acid has a single carbon atom linking the oxygen atom with the carboxy group. This acid can then be converted to the corresponding telogen iodide possessing a single carbon atom linking the oxygen and iodide atoms by the well known Hunsdiecker reaction which involves reacting the acid with alkali-free silver oxide ($Ag_2O$) to form the silver salt, followed by reaction of the silver salt with powdered iodine to form the iodide. This telogen iodide can then be telomerized with one or more olefins. Illustrative procedures are shown as follows:

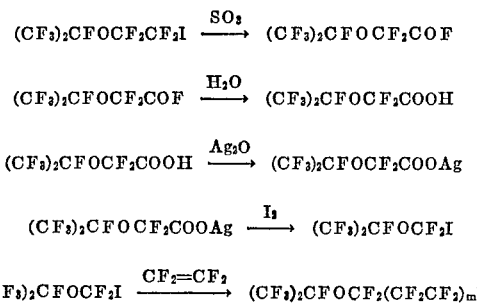

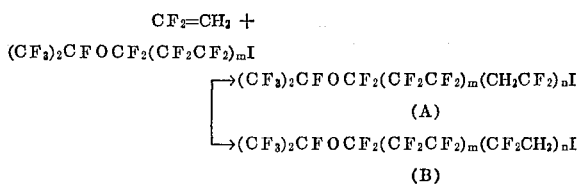

It should be noted that the above-noted telomerization reaction produces two products (A) and (B). The (A) product is obtained in about a 95% yield. The (B) product is obtained in about a 5% yield. The (A) and (B) products can be separated by conventional procedures. For example, dehydroiodinating the (A) and (B) product mixture with KOH at 75–150° C. preferentially converts product (A) to the corresponding olefin which can then be readily separated from product (B) by distillation.

For special case where $m$ and $n$ in formula I are 0 and $p$ and $r$ are one, the iodide starting materials can be obtained by reacting a telogen of the formula

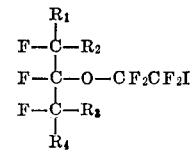

with $SO_3$, esterifying the resulting reaction products, reducing the ester to the alcohol with $LiAlH_4$ as reducing agent and reacting the alcohol with p-toluene sulfonyl chloride and metallic iodide to form the iodide containing one —$CF_2$— group and one —$CH_2$— group.

Preferred telomerizable unsaturated materials are selected from the group consisting of $CF_2=CF_2$, $CF_2=CH_2$, $CF_2=CClF$, $CF_3CF=CF_2$ and $CH_2=CH_2$, which yield ($X_1X_2C$—$CX_2X_4$) moieties of the formula

—$CF_2$—$CF_2$—,

—$CF_2$—$CH_2$—, —$CF_2$—$CClF$—, —$CF_2$—$CF(CF_3)$— and —$CH_2$—$CH_2$—, respectively. Other suitable telomerizable unsaturated materials include the following: $CCl_2=CH_2$, $CFH=CH_2$, $CClH=CH_2$, $CFH=CF_2$, $CFH=CFH$, $CClH=CClH$, $CF_2=CFBr$, $CF_2ClCF=CH_2$, $CF_2CCl=CF_2$, $(CF_3)_2C=CF_2$, $CF_3CF=CFCl$, $CF_3CH=CFCl$, $CFCl=CFCl$, $CHF=CFCF_3$, $CF_2=CF(CH_2)_6CH_3$, $CFCl=CFCl$, $CHF=CFCF_3$, $CF_2=CF(CH_2)_6CH_3$, $CF_2=CFCHClCH_3$, $CF_2=CHCF_2CH_2Cl$, $CH_2=C(CF_3)CF_2Br$, $CF_2=C(CF_3)CF_2(C_3H_7)$, $CHCl=CFCF_3$, $CH_2=CClCF_2CH_3$.

Many more suitable telomerizable unsaturated compounds, subject to the restrictions of the definition for the compounds of formula (I) given above, will readily occur to one of the ordinary skill in the art.

DESCRIPTION OF THE PREFERRED EMBODIMENTS

A preferred class of compounds within the scope of the invention occurs when $R_f$ in formula (I) has the formula

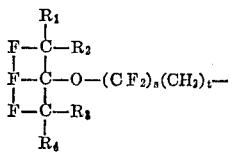

wherein $R_1$–$R_4$ are as defined above and $s$ and $t$ are integers from 1–20, preferably from 1–10, most preferably $t$ is an integer from 1–3. The preferred class of compounds can be prepared by the above described methods of preparation.

Specific examples of embodiments of the novel compounds of the invention i.e., $$(R_fQ)^+ O\bar{S}O_2OR_f,$$

are those wherein $R_f$ and Q have the following formulas:

| | $R_f$ | Q |
|---|---|---|
| 1 | $CF_3$<br>$F\overset{\|}{C}$—$OCF_2C_2$—<br>$\overset{\|}{C}F_3$ | $CH_3$<br>—$\overset{\|}{N}$—$CH_3$<br>$\overset{\|}{C}H_3$ |
| 2 | $F$<br>$F\overset{\|}{C}$—$Cl$<br>$F\overset{\|}{C}$—$O(CF_2)_2(CHCl$—$CHCl)_{20}CH_2$—<br>$F\overset{\|}{C}$—$F$<br>$(\overset{\|}{C}FCl)_9CF_2Cl$ | $(CH_2)_{11}CH_3$<br>—$\overset{\|}{N}$—$(CH_2)_{11}CH_3$<br>$(\overset{\|}{C}H_2)_{11}CH_3$ |
| 3 | $(CF_2)_9CF_3$<br>$\overset{\|}{C}$—$F_2$<br>$F\overset{\|}{C}$—$OCF_2(CF_2$—$CFBr)(CH_2$—$CH_2)_{10}$—<br>$\overset{\|}{C}F_3$ | $CH_3$ $CH_3$<br>—$\overset{\|}{N}$—$(CH_2)_3\overset{\|}{C}HCH_3$<br>$(\overset{\|}{C}H_2)_5CH_3$ |
| 4 | $(CF_3)_2$<br>$F\overset{\|}{C}$<br>$F\overset{\|}{C}$—$O$—$CF_2(CF_2$—$CF)(CH_2$—$CH)CH_2$—<br>$F_2\overset{\|}{C}$ $\overset{\|}{C}F_2$ $(\overset{\|}{C}F_2)_3$<br>$\overset{\|}{C}(CF_3)_3$ $(\overset{\|}{C}H_2)_7$ $\overset{\|}{C}F_3$<br>$\overset{\|}{C}H_3$ | $CH_2CH_2OH$<br>—$\overset{\|}{N}$—$CH_2CH_2OH$<br>$\overset{\|}{C}H_2CH_2OH$ |
| 5 | $(CF_2)_2CF_3$<br>$F\overset{\|}{C}$—$F$<br>$F\overset{\|}{C}$—$O$—$(CF_2)_2$—$(CF_2$—$CF_2)_{10}(CCl_2$—$CH_2)_{10}CH_2$—<br>$F\overset{\|}{C}$—$F$<br>$(\overset{\|}{C}F_2)_2CF_3$ | $C_2H_5$<br>—$\overset{\|}{N}$—$(CH_2)_{11}CH_2OH$<br>$\overset{\|}{C}_2H_5$ |
| 6 | $CF_2$<br>$(CF_2)_3\overset{/\ \ \ \backslash}{\ \ \ \ }F\overset{\|}{C}$—$O$—$CF_2(CF_2$—$CH_2)_5(CF_2$—$CH_2)_2$—<br>$\backslash\ \ \ /$<br>$CF$ | —$N\left(HC\overset{CH_2-CH_2}{\underset{CH_2-CH_2}{\diagdown\ \ \ \ \diagup}}CH_2\right)_3$ |
| 7 | $CF_3$<br>$\overset{\|}{C}F_2$<br>$F$—$\overset{\|}{C}$—$O(CF_2)_2CH_2$—<br>$\overset{\|}{C}F_2$ | $H_5C_2$ $CH_2$—$CH_2$<br>—$NCH\diagdown\ \ \ \ \ CH_2$<br>$H_5C_2$ $CH_2$—$CH_2$ |
| 8 | $(CF_3)_2CFO(CF_2)_{20}(CH_2)_{20}$— | $H_5C_2$<br>—$\overset{\|}{N}$—$(CH_2)_3$—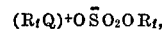<br>$H_3C$ |
| 9 | $CF_2CF_2CF_3$<br>$\overset{\|}{C}F_2$<br>$F\overset{\|}{C}$—$O(CF_2)_{10}(CH_2)_{10}$—<br>$\overset{\|}{C}F_2$<br>$\overset{\|}{C}F_3$ | triphenylamine structure |
| 10 | $(CF_3)_2CFO(CF_2)(CH_2)_3$— | $H_3C$<br>—$\overset{\|}{N}$—phenyl<br>$H_3C$ |

TABLE—Continued

| | R_f | Q |
|---|---|---|
| 11 | C(CF₃)₃<br>\|<br>CFO(CF₂)₂(CH₂)₁₀—<br>\|<br>C(CF₃)₃ | 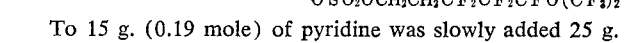 |
| | (CF₃)₂CFO(CF₂)₁₀(CH₂)₃— | 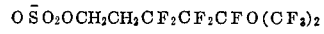 |
| 12 | F₂C—Cl<br>\|<br>F—C—OCF₂(CF₂—CF₂)₆(CH₂—CF₂)CH₂—<br>\|<br>F₂C—Cl | 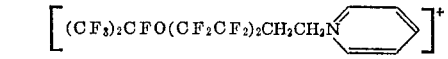 |
| 13 | (CF₃)₂CFO(CF₂)₂(CF₂—CF₂)(CH₂—CHBr)CH₂— | 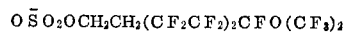 |
| 14 | (CF₂Cl)₂CFO(CF₂)₂(CH₂)₂— | 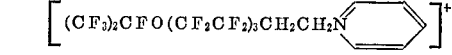 |

The invention can be more fully understood by reference to the following examples. Analyses are in percent by weight.

EXAMPLE 1

Preparation of

[(CF₃)₂CFOCF₂CF₂CH₂CH₂N(C₂H₅)₃]⁺ ⁻OSO₂OCH₂<br>CH₂CF₂CF₂CFO(CF₃)₂

To 15 g. (0.15 mole) of triethylamine was slowly added 25 g. (0.034 mole) of

[(CF₃)₂CFOCF₂CF₂CH₂CH₂O]₂SO₂.

After a slight exotherm, the stirred mixture was heated and maintained at 80–82° C. for 2 hours. Excess amine, 12 g., was decanted from the fluorinated tetraalkylammonium alkyl salt produced. The salt was washed with three portions of anhydrous diethyl ether and then heated to 50° C. under a reduced pressure of 25 mm. for 4 hours to remove unreacted amine and dialkyl sulfate ester. There was recovered 21 g. (0.025 mole) of a tan pasty solid having a melting point of 96°–98° C.

Analysis for C₂₀F₂₂H₂₃NSO₆ gave the following results: Calculated: C, 29.16; F, 50.77; H, 2.77; S, 3.88. Found: C, 29.28; F, 49.32; H, 2.39; S, 4.25.

EXAMPLE 2

Preparation of

[(CF₃)₂CFO(CF₂CF₂)₂CH₂CH₂N(C₂H₅)₃]⁺<br>⁻OSO₂OCH₂CH₂(CF₂CF₂)₂CFO(CF₃)₂

To 26 g. (0.26 mole) of triethylamine was slowly added 35 g. (0.038 mole) of

[(CF₃)₂CFO(CF₂CF₂)₂CH₂CH₂O]₂SO₂.

After a slight exotherm the temperature was raised to 80–85° C. and maintained there for 2½ hours. The fluorinated tetraalkylammonium alkyl salt, 27 g. (0.0027 mole), was recovered as a tan pasty solid having a melting point of 102–104° C.

Analysis for C₂₄F₃₀H₂₃NSO₆ gave the following results: Calculated: C, 28.15; F, 55.71; H, 2.25; S, 3.12. Found: C, 28.53; F, 53.85; H, 2.36; S, 3.75.

EXAMPLE 3

Preparation of

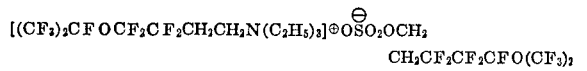

To 15 g. (0.19 mole) of pyridine was slowly added 25 g. (0.34 mole) of [(CF₃)₂CFOCF₂CF₂CH₂CH₂O]₂SO₂. After a slight exotherm to 38° C., the stirred mixture was heated and maintained at 80–85° C. for 2 hours. Excess amine (13 g.) was recovered by heating the mixture to 80° C. under a reduced pressure of 1 mm. for 4 hours. There was recovered 26 g. (0.032 mole) of a light tan crystalline solid having a melting point of 67–70° C.

Analysis for C₁₉F₂₂H₁₃NSO₆ gave the following results: Calculated: C, 27.21; F, 52.17; H, 1.62; S, 4.00. Found: C, 26.85; F, 52.49; H, 1.73; S, 4.22.

EXAMPLE 4

Preparation of

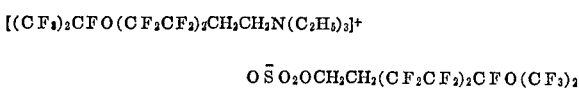

To 15 g. (0.19 mole) of pyridine was slowly added 25 g. (0.029 mole) of [(CF₃)₂CFO(CF₂CF₂)₂CH₂CH₂O]₂SO₂. The mixture was then heated to 96°–100° C. for 2½ hours with stirring. Excess amine was recovered by heating the mixture to 80° C. under a reduced pressure of 1 mm. for 3 hours. There was recovered 28.6 g. (0.0286 mole) of a tan crystalline solid having a melting point of 55–56° C.

Analysis for C₂₃F₃₀H₁₃SNO₆ gave the following results: Calculated: C, 27.57; F, 56.94; H, 1.29; N, 1.39; S, 3.19. Found: C, 26.92; F, 57.07; H, 1.35; N, 1.45; S, 3.46.

EXAMPLE 5

Preparation of

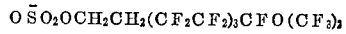

To 15 g. (0.0134 mole) of

[(CH₃)₂CFO(CF₂CF₂)₃CH₂CH₂O]₂SO₂ was added 15 g. (0.19 mole) of pyridine. The mixture was then heated to 100–105° C. for 2 hours. On cooling, excess amine was decanted from the pasty-solid lower layer. The product was heated to 80° C. under a reduced pressure of 1 mm. to remove additional unreacted amine. There was recovered 14 g. (0.012 mole) of a tan crystalline solid having a melting point of 99–101° C.

Analysis for $C_{27}F_{38}H_{13}SNO_6$ gave the following results: Calculated: C, 27.00; F, 60.11; H, 1.08; N, 1.16; S, 2.66. Found: C, 26.84; F, 59.93; H, 1.25; N, 1.32; S, 2.84.

EXAMPLE 6

Table I below lists illustrative sulfate salts that have been prepared and shows the reduction in surface tension produced when a small amount is dissolved in water; the first row giving the surface tension value in the absence of additive. All values were measured at 25° C.

TABLE I

Surface tensions (dynes/cm.) of water with and without additives

| | | | | |
|---|---|---|---|---|
| Value without additive | 72.3 | | | |
| Amount of additive (percent by wt.) | 1.0 | 0.5 | 0.1 | 0.05 |
| Additive compounds of example: | | | | |
| 1 | 15.3 | 15.3 | 16.1 | 16.3 |
| 2 | 16.3 | 15.9 | 20.8 | 31.6 |
| 3 | 15.8 | 15.4 | 16.0 | 17.1 |
| 4 | 15.4 | 15.8 | 17.1 | 18.0 |
| 5 | 16.1 | 16.1 | 15.7 | 16.1 |

EXAMPLE 7

The sulfate salts were tested as textile treating agents. Samples of cotton print cloth were padded with 0.5% aqueous solutions of the fluorochemicals, squeezed to remove excess solution (100% wet pick-up), then dried at about 160° C. for 4 minutes. The oil repellency was measured and the results are shown in Table II below.

The procedure employed in measuring the oil repellency is described, for example, on pages 323–4 of the April 1962 edition of the textile Research Journal. This procedure involves gently placing on the treated fabric drops of mixtures of mineral oil and n-heptane in varying proportions. The drops are allowed to stand on the treated fabric undisturbed for 3 minutes, after which the wetting and penetration of the fabric is visually observed. The number corresponding to the mixture containing the highest percentage of heptane which does not penetrate or wet the fabric is considered to be the oil repellency rating of the treated fabric. A rating of 70 or higher is considered good.

TABLE II

| Compound of: | Oil repellency |
|---|---|
| Example 1 | 70 |
| Example 2 | 100 |
| Example 3 | 100 |
| Example 4 | 130 |
| Example 5 | 130 |

We claim:

1. A compound of the formula

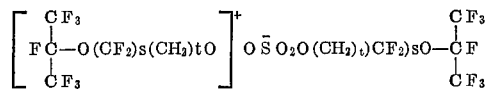

wherein Q is a quaternary ammonium radical and $s$ and $t$ are integers from 1 to 10.

2. The compound of claim 1 wherein $t$ is an integer from 1 to 3.
3. The compound of claim 2 wherein Q is pyridine.
4. The compound of claim 3 wherein $s$ is 2 and $t$ is 2.
5. The compound of claim 3 wherein $s$ is 4 and $t$ is 2.
6. The compound of claim 3 wherein $s$ is 6 and $t$ is 2.

References Cited

UNITED STATES PATENTS

| 3,335,163 | 8/1967 | Tesoro et al. | 260—456 |
| 3,647,887 | 3/1972 | Anello et al. | 260—611 A |
| 3,651,073 | 3/1972 | Kahn et al. | 260—297 R |
| 3,651,120 | 3/1972 | Anello et al. | 260—458 |
| 3,674,798 | 7/1972 | Price et al. | 260—294.8 R |
| 3,706,773 | 12/1972 | Anello et al. | 260—458 |
| 3,739,033 | 6/1973 | Anello et al. | 260—615 F |
| 3,766,274 | 10/1973 | Anello et al. | 260—584 C |

OTHER REFERENCES

Karrer: Organic Chemistry, 2nd English Edition, Elsevior Publishing Co. (New York), pp. 901–902 (1946).

ALAN L. ROTMAN, Primary Examiner

U.S. Cl. X.R.

8—116.2; 117—138.5; 252—2, 8.75; 260—247.1, 283 S, 286 Q, 293.9, 458

UNITED STATES PATENT OFFICE
CERTIFICATE OF CORRECTION

Patent No. 3,839,343  Dated October 1, 1974

Inventor(s) LOUIS G. ANELLO and RICHARD F. SWEENEY

It is certified that error appears in the above-identified patent and that said Letters Patent are hereby corrected as shown below:

Col. 3, line 59 - after "iodide" insert -- . --;

Col. 4, last formula that part which reads $$\text{"}\begin{array}{c} R_1 \\ | \\ F-C-R_2 \\ | \\ F-C-O- \\ | \\ F-C-R_3 \\ | \\ R_4 \end{array}\text{"} \quad \text{should read} \quad --\begin{array}{c} R_1 \\ | \\ F-C-R_2 \\ | \\ F-C-O- \\ | \\ F-C-R_3 \\ | \\ R_4 \end{array} --;$$

Cols. 5-6 under heading "$R_f$"

First formula - that part which reads "$FC-OCF_2C_2-$"

should read -- $FC-OCF_2CH_2-$ --;

Second formula - that part which reads $$\text{"}\begin{array}{c} F \\ | \\ FC-Cl \\ | \\ FC-O \\ | \\ FC-F \end{array}\text{"}$$

UNITED STATES PATENT OFFICE
CERTIFICATE OF CORRECTION

Patent No. 3,839,343  Dated October 1, 1974

Inventor(s) LOUIS G. ANELLO and RICHARD F. SWEENEY

It is certified that error appears in the above-identified patent and that said Letters Patent are hereby corrected as shown below:

should read -- 
$$\begin{array}{c} F \\ | \\ FC-Cl \\ | \\ FC-O \\ | \\ FC-F \end{array} \text{--;}$$

Fifth formula - that part which reads "
$$\begin{array}{c} (CF_2)_2CF_3 \\ | \\ FC-F \\ | \\ FC-O- \\ | \\ FC-F \end{array}\text{"}$$

should read --
$$\begin{array}{c} (CF_2)_2CF_3 \\ | \\ FC-F \\ | \\ FC-O- \\ | \\ FC-F \end{array} \text{--;}$$

Seventh formula - that part which reads "
$$\begin{array}{c} CF_3 \\ | \\ CF_2 \\ | \\ F-C-O \\ | \\ CF_2 \end{array}$$

UNITED STATES PATENT OFFICE
CERTIFICATE OF CORRECTION

Patent No. 3,839,343    Dated October 1, 1974

Inventor(s) LOUIS G. ANELLO and RICHARD F. SWEENEY

It is certified that error appears in the above-identified patent and that said Letters Patent are hereby corrected as shown below:

should read -- $\begin{array}{c} CF_3 \\ | \\ CF_2 \\ | \\ F-C-O \\ | \\ CF_3 \end{array}$ --;

Col. 8, line 72 - "[(CH$_3$)$_2$CFO" should read -- [(CF$_3$)$_2$CFO --;

Col. 10, claim 1 - "$\left[ \begin{array}{c} CF_3 \\ | \\ FC-O(CF_2)S(CH_2)tO \\ | \\ CF_3 \end{array} \right]^+ \quad \begin{array}{c} CF_3 \\ | \\ OSO_2O(CH_2)_t)CF_2)SO-CF \\ | \\ CF_3 \end{array}^-$"

should read

-- $\left[ \begin{array}{c} CF_3 \\ | \\ FC-O(CF_2)_s(CH_2)_tO \\ | \\ CF_3 \end{array} \right]^+ \quad \begin{array}{c} CF_3 \\ | \\ OSO_2O(CH_2)_t(CF_2)_sO-CF \\ | \\ CF_3 \end{array}^-$ --

Signed and sealed this 11th day of February 1975.

(SEAL)
Attest:

RUTH C. MASON
Attesting Officer

C. MARSHALL DANN
Commissioner of Patents
and Trademarks